United States Patent
Kim et al.

(10) Patent No.: US 10,818,950 B2
(45) Date of Patent: Oct. 27, 2020

(54) COMPOSITE POLYMER ELECTROLYTE MEMBRANE FOR FUEL CELL, AND METHOD OF MANUFACTURING THE SAME

(71) Applicants: KOREA INSTITUTE OF SCIENCE AND TECHNOLOGY, Seoul (KR); GLOBAL FRONTIER CENTER FOR MULTISCALE ENERGY SYSTEMS, Seoul (KR)

(72) Inventors: Jin Young Kim, Seoul (KR); Kyung-jin Lee, Seoul (KR); Kyungah Lee, Seoul (KR); Nayoung Kim, Seoul (KR); So Young Lee, Seoul (KR); Sung Jong Yoo, Seoul (KR); Jong Hyun Jang, Seoul (KR); Hyoung-Juhn Kim, Seoul (KR); Jonghee Han, Seoul (KR); Suk Woo Nam, Seoul (KR); Tae Hoon Lim, Seoul (KR)

(73) Assignees: GLOBAL FRONTIER CENTER FOR MULTISCALE ENERGY SYSTEMS, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 107 days.

(21) Appl. No.: 15/885,814

(22) Filed: Feb. 1, 2018

(65) Prior Publication Data

US 2018/0241061 A1 Aug. 23, 2018

(30) Foreign Application Priority Data

Feb. 20, 2017 (KR) .......... 10-2017-0022478

(51) Int. Cl.
| | | |
|---|---|---|
| H01M 8/10 | (2016.01) | |
| B01D 69/10 | (2006.01) | |
| B01D 69/02 | (2006.01) | |
| B01D 71/36 | (2006.01) | |
| B01D 67/00 | (2006.01) | |
| B01J 35/00 | (2006.01) | |
| H01M 8/1081 | (2016.01) | |
| H01M 8/1023 | (2016.01) | |
| H01M 8/1039 | (2016.01) | |
| H01M 8/1053 | (2016.01) | |
| H01M 8/1067 | (2016.01) | |
| H01M 8/106 | (2016.01) | |
| H01M 8/1018 | (2016.01) | |

(52) U.S. Cl.
CPC .......... *H01M 8/1081* (2013.01); *B01D 69/02* (2013.01); *B01D 69/10* (2013.01); *H01M 8/106* (2013.01); *H01M 8/1023* (2013.01); *H01M 8/1039* (2013.01); *H01M 8/1053* (2013.01); *H01M 8/1067* (2013.01); *B01D 67/0088* (2013.01); *B01D 71/36* (2013.01); *B01D 2325/04* (2013.01); *B01D 2325/14* (2013.01); *B01J 35/0033* (2013.01); *H01M 2008/1095* (2013.01); *H01M 2300/0082* (2013.01); *H01M 2300/0094* (2013.01); *Y02P 70/56* (2015.11)

(58) Field of Classification Search
CPC ............. H01M 8/1081; H01M 8/1023; H01M 8/1039; H01M 8/1053; H01M 8/1067; H01M 8/106; H01M 2300/0094; H01M 2300/0082; H01M 2008/1095; B01D 69/10; B01D 69/02; B01D 71/36; B01D 67/0088; B01D 2325/04; B01D 2325/14
USPC ......................................... 521/27
See application file for complete search history.

(56) References Cited

U.S. PATENT DOCUMENTS

| | | |
|---|---|---|
| 5,547,551 A | 8/1996 | Bahar et al. |
| 8,652,705 B2 | 2/2014 | Berta et al. |
| 8,785,060 B2 | 7/2014 | Kwon |
| 2007/0231556 A1 | 10/2007 | Park et al. |
| 2008/0292942 A1* | 11/2008 | You ....................... H01M 4/881 429/482 |
| 2009/0209668 A1 | 8/2009 | Lee et al. |
| 2011/0008708 A1 | 1/2011 | Akita et al. |
| 2012/0058414 A1* | 3/2012 | Cho ....................... H01M 4/926 429/492 |

FOREIGN PATENT DOCUMENTS

| | | |
|---|---|---|
| EP | 2848620 A1 | 3/2015 |
| JP | 2014139939 A | 7/2014 |
| KR | 100746339 B1 | 8/2007 |
| KR | 1020070098157 A | 10/2007 |
| KR | 1020080040225 A | 5/2008 |
| KR | 1020090090079 A | 8/2009 |
| KR | 1020130078153 A | 7/2013 |
| KR | 1020130078498 A | 7/2013 |
| KR | 101494289 B1 | 2/2015 |
| KR | 1020150135116 A | 12/2015 |
| KR | 1020170003479 A | 1/2017 |

OTHER PUBLICATIONS

Danmin Xing et al., "Properties and morphology of Nafion/polytetrafluoroethylene composite membrane fabricated by a solution-spray process", International Journal of Hydrogen Energy, 2013, pp. 8400-8408, vol. 38.

* cited by examiner

*Primary Examiner* — Michael Bernshteyn
(74) *Attorney, Agent, or Firm* — Cantor Colburn LLP

(57) ABSTRACT

A composite polymer electrolyte membrane for a fuel cell may be manufactured by the following method: partially or totally filling the inside of a pore of a porous support with a hydrogen ion conductive polymer electrolyte solution by performing a solution impregnation process; and drying the hydrogen ion conductive polymer electrolyte solution while completely filling the inside of the pore with the hydrogen ion conductive polymer electrolyte solution by performing a spin dry process on the porous support of which the inside of the pore is partially or totally filled with the hydrogen ion conductive polymer electrolyte solution.

14 Claims, 16 Drawing Sheets

To vacuum pump

2nd impregnation

COMPOSITE POLYMER ELECTROLYTE MEMBRANE FOR FUEL CELL, AND METHOD OF MANUFACTURING THE SAME

CROSS-REFERENCE TO RELATED APPLICATION

This application claims the priority of Korean Patent Application No. 10-2017-0022478, filed on Feb. 20, 2017, and all the benefits accruing therefrom under 35 U.S.C. § 119, the contents of which in its entirety are herein incorporated by reference.

BACKGROUND

1. Field

The present disclosure relates to a composite polymer electrolyte membrane for a fuel cell and a method of manufacturing the same. More specifically, the present disclosure relates to a composite polymer electrolyte membrane for a polymer electrolyte membrane fuel cell (PEMFC) and a method of manufacturing the same.

[Description of the National Support Research and Development]

This study was conducted with the support from the Korea Institute of Energy Technology Evaluation and Planning funded by the Ministry of Trade, Industry and Energy, Republic of Korea under the supervision of the Korea Institute of Science and Technology, the project title is the Development of New and Renewable Energy Core Technology, and the project name is the Localization of Perfluorinated Sulfonic Acid Ionomer-PTFE Reinforced Membrane for Automotive Fuel Cells (2MR4760)(Project Identification No.: 1415146776).

Further, this study was conducted with the support from the National Research Foundation of Korea funded by the Ministry of Science and ICT, Republic of Korea under the supervision of the Global Frontier Center for Multiscale Energy System, the project title is the Global Frontier Project, and the project name is the Multiscale High Power Long Service Life Membrane-Electrode Assembly Technology (2N51190)(Project Identification No.: 2016M3A6A7945505).

In addition, this study was conducted with the support from the National Research Foundation of Korea funded by the Ministry of Science and ICT, Republic of Korea under the supervision of the Korea Institute of Science and Technology, the project title is the School and Research Cooperation Support Project Associated with Specialized Graduate School, and the project name is the Green School Specialized Graduate School Promotion Project for Producing High-Skilled Manpower in Energy and Environmental Technology—Policy Integration Field in response to Climate Change and Performing Researches (or Development of Clean Power Generation System Original Technology) (2N42261)(Project Identification No.: 2016U00034).

2. Description of the Related Art

A polymer electrolyte membrane fuel cell (PEMFC) is a type of fuel cell which has been highlighted as a next-generation energy source, and is a fuel cell which uses a polymer membrane having a hydrogen ion exchange characteristic as an electrolyte. The polymer electrolyte membrane fuel cell (PEMFC) is required to include a polymer electrolyte membrane having not only electrical insulating properties, but also characteristics such as high hydrogen ionic conductivity, low electron conductivity and gas permeability, and high mechanical strength and dimensional stability in order to improve an initial performance and secure a long-term performance.

Meanwhile, as a polymer electrolyte membrane for a polymer electrolyte membrane fuel cell (PEMFC), a pure perfluorinated sulfonic acid polymer electrolyte membrane such as a Nafion single membrane manufactured by DuPont Inc. has been currently commercialized and most widely used. However, the pure perfluorinated sulfonic acid polymer electrolyte membrane has problems in that the membrane has high costs, low mechanical and morphological stability, and a sharply decreased hydrogen ion conductivity at a temperature of 100° C., and the like in spite of excellent chemical resistance, oxidation resistance, and ion conductivity, so that there is an increasing need for a new polymer electrolyte membrane which has the corresponding disadvantages supplemented and may be manufactured by an economical manufacturing method while having excellent characteristics as described above.

As one method for that, studies have been actively conducted on a composite polymer electrolyte membrane using a porous support. The method can make a composite polymer electrolyte membrane thin, and thus can reduce the resistance caused by the corresponding membrane thickness when a fuel cell is driven, and the composite polymer electrolyte membrane may be implemented so as to have excellent characteristics as described above while securing mechanical and morphological stability. Accordingly, it is expected that various problems of existing polymer electrolyte membranes may be solved through a composite polymer electrolyte membrane, and the composite polymer electrolyte membrane has been recently proposed as one of the most important technical issues for commercialization of fuel cell vehicles.

However, in a thinned composite polymer electrolyte membrane, there may occur a problem in that gas permeates in a much larger amount through the corresponding membrane due to the small membrane thickness than in a normal composite polymer electrolyte membrane. In this case, an operation efficiency of a fuel cell may be reduced, and particularly gases penetrating through the corresponding membrane chemically degrade the electrolyte membrane by forming radicals, and thus may serve to be responsible for deterioration in durability of the fuel cell. Therefore, there may be a restriction in universally using a composite polymer electrolyte membrane in various electrochemical energy conversion devices in the future and economically implementing the composite polymer electrolyte membrane without a substantial improvement in the minimization of a gas permeation phenomenon of the composite polymer electrolyte membrane.

SUMMARY

In an aspect, the present disclosure is directed to providing a composite polymer electrolyte membrane for a fuel cell, which is implemented in the form of a composite thin membrane, and thus has not only high hydrogen ion exchange characteristics, but also improved gas permeability, has an excellent mechanical strength as compared to the thickness, and is economical and easily manufactured without occurrence of physical damage.

In an aspect, the present disclosure provides a method of manufacturing a composite polymer electrolyte membrane for a fuel cell according to exemplary embodiments for achieving an object, the method including: partially or totally filling the inside of a pore of a porous support with a hydrogen ion conductive polymer electrolyte solution by performing a solution impregnation process; and drying the hydrogen ion conductive polymer electrolyte solution while completely filling the inside of the pore with the hydrogen ion conductive polymer electrolyte solution by performing a spin dry process on the porous support in which the inside of the pore is partially or totally filled with the hydrogen ion conductive polymer electrolyte solution.

In an exemplary embodiment, the spin dry process may be performed after the solution impregnation process is performed.

In another exemplary embodiment, the hydrogen ion conductive polymer electrolyte solution may be a perfluorinated sulfonic acid ionomer (PFSA ionomer) solution, and the porous support may be a porous fluorinated polymer support.

In another exemplary embodiment, the perfluorinated sulfonic acid ionomer solution may include a perfluorinated sulfonic acid ionomer in an amount of about 1 wt % to about 20 wt % based on a total amount of the perfluorinated sulfonic acid ionomer solution.

In another exemplary embodiment, the solution impregnation process may be a spray process, and may be performed by spraying a hydrogen ion conductive polymer solution onto a porous support.

In another exemplary embodiment, during the spray process, the hydrogen ion conductive polymer electrolyte solution may be sprayed at a flow rate of 2 ml/min to 6 ml/min under a pressure of 2 bar to 4 bar.

In another exemplary embodiment, the hydrogen ion conductive polymer electrolyte solution may be sprayed in a gravitational direction onto the porous support.

In another exemplary embodiment, before performing the solution impregnation process, the porous support may be treated with acetone, methanol, ethanol, propanol, or hydrogen peroxide.

In another exemplary embodiment, the spin dry process may include: a first spin dry process performed under about 100 rpm to about 200 rpm; and a second spin dry process performed under about 3,000 rpm to about 4,000 rpm for a longer period of time than the first spin dry process. In this case, the second spin dry process may be performed for about 90 seconds or more after the first spin dry process, and the first spin dry process and the second spin dry process may be sequentially performed repeatedly one or more times.

A composite polymer electrolyte membrane for a fuel cell according to an exemplary embodiment for achieving an object of the present disclosure is manufactured by the above-described manufacturing method, and thus includes: a porous support; and a hydrogen ion conductive polymer electrolyte which completely fills the inside of the pore of the porous support.

In an exemplary embodiment, the porous support may be a porous fluorinated polymer support, and may be treated with acetone, methanol, ethanol, propanol, or hydrogen peroxide.

In another exemplary embodiment, the hydrogen ion conductive polymer electrolyte may be a perfluorinated sulfonic acid ionomer (PFSA ionomer), and may be composited by being bonded to the porous support.

In another exemplary embodiment, the composite polymer electrolyte membrane may have a thickness of about 10 µm to about 20 µm.

In another exemplary embodiment, the composite polymer electrolyte membrane may constitute a membrane electrode assembly of a polymer electrolyte fuel cell.

A composite polymer electrolyte membrane of the present invention is manufactured by a method of sequentially performing a pre-treatment process, a solution impregnation process such as a spray process, and a spin dry process, and thus may have a form of a composite thin membrane including a porous support. At this time, a hydrogen ion conductive polymer electrolyte can be impregnated in various directions, and thus may more easily fill the insides of porous support pores uniformly and tightly distributed with a 3-D network structure. Accordingly, in the composite polymer electrolyte membrane, a residual pore which is not sufficiently filled with a hydrogen ion conductive polymer electrolyte, or a void may not be substantially present. In addition, since polymer chains of the hydrogen ion conductive polymer electrolyte are parallelly arranged inside of the pore through the spin dry process, a performance deterioration or degradation problem caused by low gas permeability may not occur in the composite polymer electrolyte membrane. As a result, the composite polymer electrolyte membrane according to exemplary embodiments of the present disclosure may have characteristics such as improved hydrogen ion exchange characteristics, low electron conductivity and gas permeability, high mechanical strength as compared to the thickness, and the like, which are comparable to or better than those of an existing polymer electrolyte membrane for a fuel cell.

Further, the composite polymer electrolyte membrane can be manufactured by minimally using a hydrogen ion conductive electrolyte such as an expensive perfluorinated sulfonic acid ionomer, and thus may have an additional advantage in terms of price competitiveness as compared to the existing polymer electrolyte membrane for a fuel cell.

Therefore, it is possible to easily implement a membrane electrode assembly having excellent performance through the composite polymer electrolyte membrane for a fuel cell as described above, and a fuel cell including the same.

DETAILED DESCRIPTION

Figure 1:
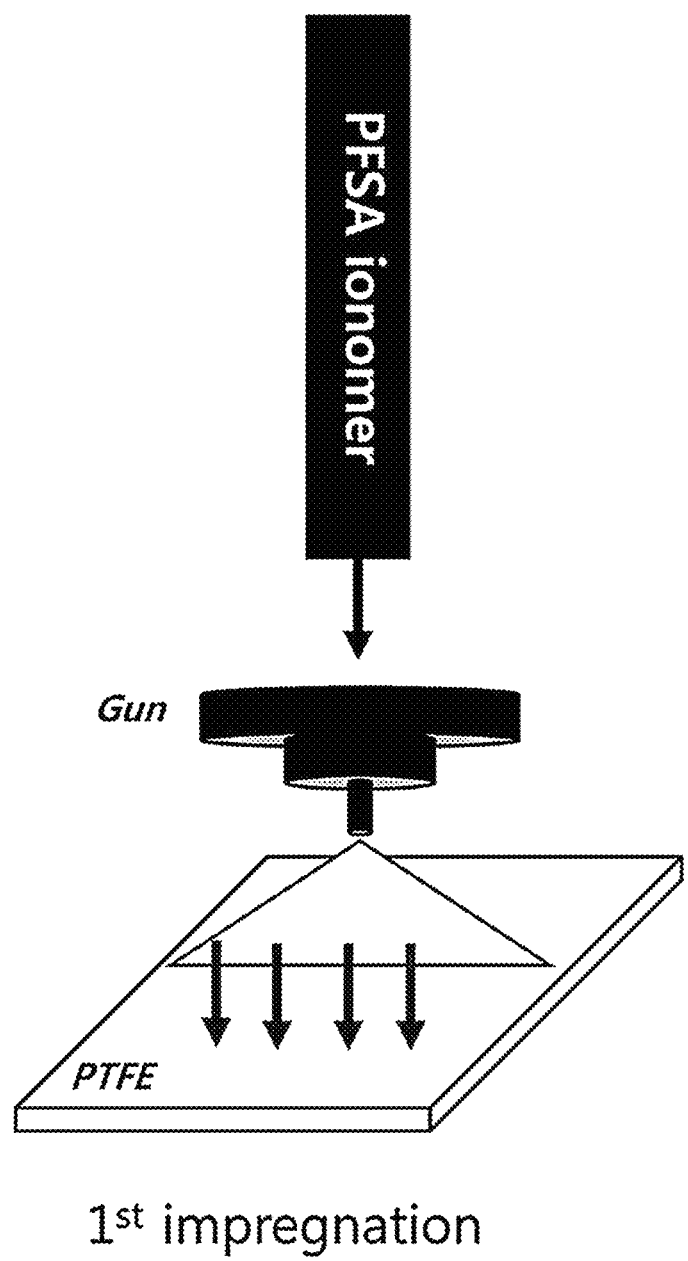
FIG. 1 is a schematic view showing a spray process as a solution impregnation process for manufacturing a composite polymer electrolyte membrane according to an exemplary embodiment of the present disclosure.

Hereinafter, preferred embodiments of the present disclosure will be described in detail with reference to the accompanying drawings.

The Examples of the present disclosure disclosed herein are exemplified for the purpose of describing the Examples of the present disclosure only, and the Examples of the present disclosure may be carried out in various forms and should not be construed to be limited by the Examples described herein.

Since the present disclosure may have various changes and different forms, it should be understood that the Examples are not intended to limit the present disclosure to specific disclosure forms and they include all the changes, equivalents and replacements included in the spirit and technical scope of the present disclosure.

In the present specification, being composited or occurrence of composition means that a perfluorinated sulfonic acid polymer electrolyte (ionomer), which is a polymer electrolyte having hydrogen ion conductivity, is combined with a porous fluorinated polymer support so as to have a more effective function by being physically and/or chemically bonded to the porous fluorinated polymer support.

In the present specification, a $H_2$ crossover means a hydrogen permeation phenomenon occurring when unreacted hydrogen in an anode electrode passes through a polymer electrolyte membrane, and then comes to a cathode electrode, and a gas permeability of the corresponding polymer electrolyte membrane may be measured through the hydrogen permeation phenomenon. The $H_2$ crossover phenomenon, that is, an undesirable diffusion of gas from the anode electrode to the cathode electrode is known to be mainly responsible for degradation of a perfluorinated electrolyte membrane, and in general, the smaller the thickness of the corresponding electrolyte membrane is, the more easily the phenomenon may occur. In the present disclosure, the current of the corresponding cell was measured in an interval of 0 V to 0.6 V (vs. the anode) by using linear sweep voltammetry (LSV) while supplying the anode electrode and the cathode electrode with hydrogen and nitrogen, respectively, in order to confirm whether the $H_2$ crossover phenomenon occurs, and the $H_2$ crossover current density.

In the present specification, the term 'solution impregnation process' refers to a process of preparing a polymer electrolyte in a solution state other than a solid or gas state, and then impregnating the polymer electrolyte in a solution state in a procedure of impregnating the polymer electrolyte in a porous support. As a method of dissolving a polymer electrolyte in a solution, and the like have been recently reported, a method of preparing the polymer electrolyte in a membrane state by using a solution impregnation process can be performed. As the solution impregnation process, various methods can be performed, and as a method currently reported in the literature for the purpose of manufacturing a composite polymer electrolyte membrane for a fuel cell, there are a method of immersing a porous support in a polymer electrolyte solution for a predetermined time, and then impregnating the polymer electrolyte, a spray method, an inkjet printing method, a decal method, a doctor blade method, a roll-to-roll method, and the like. Among the enumerated processes, a spray process was used as an impregnation process in the present disclosure.

In the present specification, the term 'spin dry process' refers to a process including: positioning a porous support in which the inside of a pore is at least partially filled with a hydrogen ion conductive polymer electrolyte on a spin coater, such that one surface of the porous support is oriented substantially vertically to a gravitational direction, and drying a solvent of the hydrogen ion conductive polymer electrolyte solution applied on the one surface of the porous support or at least partially filling the inside of the pore of the porous support by using a rotational force (centrifugal force) of the spin coater rapidly rotating at a predetermined rate or more. At this time, polymer chains of the hydrogen ion conductive polymer electrolyte may be arranged substantially vertical to the gravitational direction, that is, substantially parallel to the one surface, and accordingly, it is possible to more effectively fill the insides of a plurality of pores uniformly and tightly distributed with a 3-D network structure in the porous support without any occurrence of physical damages or defects.

Composite Polymer Electrolyte Membrane for Fuel Cell

A composite polymer electrolyte membrane of the present disclosure is an electrolyte membrane for a fuel cell, and specifically, the composite polymer electrolyte membrane is an electrolyte membrane which may constitute a membrane electrode assembly (MEA) of a polymer electrolyte membrane fuel cell (PEMFC). The composite polymer electrolyte membrane includes: a porous support; and a hydrogen ion conductive polymer electrolyte which uniformly and tightly, that is, substantially completely fills the inside of the pore of the porous support.

The porous support may have a plurality of pores uniformly and tightly distributed with a 3-D network structure inside thereof, thereby contributing to improvement of mechanical strength and morphological stability of the composite polymer electrolyte membrane. As the porous support, a porous fluorinated polymer support such as, for example, a porous polytetrafluoroethylene (PTFE) support may be used. The porous fluorinated polymer support is chemically stable due to strong bonding strength between carbon and fluorine and screening effects which are characteristics of a fluorine atom. Further, the porous fluorinated polymer support has a chemical structure similar to that of the hydrogen ion conductive polymer electrolyte, specifically, a perfluorinated sulfonic acid ionomer (PFSA) ionomer, and thus is advantageous in impregnating the inside of the pore, and may be usefully used in the present disclosure due to excellent mechanical characteristics.

In an exemplary embodiment, the porous support may be treated with acetone, methanol, ethanol, propanol, or hydrogen peroxide. A porous fluorinated polymer support such as a porous polytetrafluoroethylene (PTFE) support has hydrophobicity, and thus has low wettability due to a higher affinity for the air than the hydrogen ion conductive polymer electrolyte. For that reason, in spite of the advantages as described above, it may be difficult to implement a composite polymer electrolyte membrane having a uniform and tight internal structure without a residual pore or a void by using the advantages. However, the porous fluorinated polymer support may have improved wettability by being treated with acetone, methanol, ethanol, propanol, or hydrogen peroxide, and furthermore, may not include any impurities in the inside and/or on the surface thereof.

The improved wettability of the porous fluorinated polymer support is advantageous in more uniformly and tightly, that is, substantially completely filling the inside of the pore of the porous fluorinated polymer support with the hydrogen ion conductive electrolyte. Accordingly, the composite polymer electrolyte membrane may have a high membrane density, and as a result, may have a much improved mechanical strength. Further, since the interval between hydrophilic ion domains in the inside of the composite polymer electrolyte membrane is narrowed, the composite polymer electrolyte membrane may have enhanced ionic conductivity and dimensional stability.

The hydrogen ion conductive polymer electrolyte may be, for example, a perfluorinated sulfonic acid ionomer (PFSA) ionomer such as a Nafion ionomer. The perfluorinated sulfonic acid ionomer (PFSA) ionomer has a structure which is in the same form as a main chain of polytetrafluoroethylene (PTFE) as described above in relation to the porous support, and thus, may have high chemical affinity for the porous fluorinated polymer support. Accordingly, the perfluorinated sulfonic acid ionomer (PFSA ionomer) and the porous fluorinated polymer support may be composited by being strongly bonded to each other, and the composition may finally contribute to improved stability of the composite polymer electrolyte membrane.

In particular, in an exemplary embodiment, in the hydrogen ion conductive polymer electrolyte, for example, a perfluorinated sulfonic acid (PFSA) ionomer, polymer chains thereof may be arranged parallel to the inside of the pore of the porous support, for example, a porous fluorinated polymer support, that is, may be arranged substantially parallel to one surface of the composite polymer electrolyte membrane facing an anode electrode and a cathode electrode when a membrane electrode assembly (MEA) is constituted. Accordingly, the inside of the pore of the porous support may be more effectively filled, such that a gas permeation phenomenon through the composite polymer electrolyte membrane does not occur, thereby contributing to improvement of gas permeability of the composite polymer electrolyte membrane.

The composite polymer electrolyte membrane may include a perfluorinated sulfonic acid ionomer in an appropriate content, for example, an amount of about 40 wt % based on the total weight of the composite polymer electrolyte membrane, such that the composite polymer electrolyte membrane may be implemented in the form of a thin membrane without having degraded characteristics such as low hydrogen ion exchange characteristics and high gas permeability due to the lack of the electrolyte. Meanwhile, the performance of the composite polymer electrolyte membrane may be improved in proportion to the content of the perfluorinated sulfonic acid ionomer, but when an expensive perfluorinated sulfonic acid ionomer is contained in an excessive amount, the manufacturing costs may be increased, and as a result, it may be difficult to implement an efficient composite polymer electrolyte as compared to the content of the electrolyte and the thickness.

Further, the composite polymer electrolyte membrane may have a thickness of about 10 µm to about 20 µm. The existing polymer electrolyte membranes for a fuel cell, for example, polymer electrolyte membranes composed of a pure perfluorinated sulfonic acid polymer such as a Nafion electrolyte membrane generally have a large thickness of about 25 um or more for a reinforced mechanical characteristic. However, since an increase in thickness of an electrolyte membrane increases not only a mechanical characteristic, but also the resistance of the membrane, the ionic conductivity of the electrolyte membrane may be lowered in proportion as the electrolyte membrane has a large thickness. In contrast, since the composite polymer electrolyte membrane of the present disclosure has a high membrane density and a high mechanical characteristic as described above, the composite polymer electrolyte membrane of the present disclosure may have an ionic conductivity and a mechanical characteristic, which are substantially equal to or higher than those of the existing polymer electrolyte membranes for a fuel cell, even though the composite polymer electrolyte membrane of the present disclosure has a thickness of, for example, about 10 µm to about 25 µm, specifically, a very small thickness of about 15 µm. That is, the composite polymer electrolyte membrane may simultaneously have excellent hydrogen ion exchange characteristics and mechanical strength as compared to the thickness.

As described above, the composite polymer electrolyte membrane of the present disclosure is implemented in the form of a composite thin membrane including a porous support, and thus has high hydrogen ion exchange characteristics and low gas permeability and electron conductivity, and has an excellent mechanical strength as compared to the thickness. Further, the composite polymer electrolyte membrane has the excellent characteristics as described above, which are comparable to or better than those of an existing polymer electrolyte membrane while including a perfluorinated sulfonic acid ionomer with a high unit cost (for example, a Nafion ionomer) in a relatively small content, and thus may have an additional advantage in terms of price competitiveness.

Accordingly, it is possible to easily implement a membrane electrode assembly (MEA) having excellent performance and a fuel cell including the same. In particular, since the composite polymer electrolyte membrane has high mechanical strength, a fuel cell stack may be easily manufactured without any damage to the electrolyte membrane through the high mechanical strength.

Method of Manufacturing Composite Polymer Electrolyte Membrane for Fuel Cell

Figure 2:
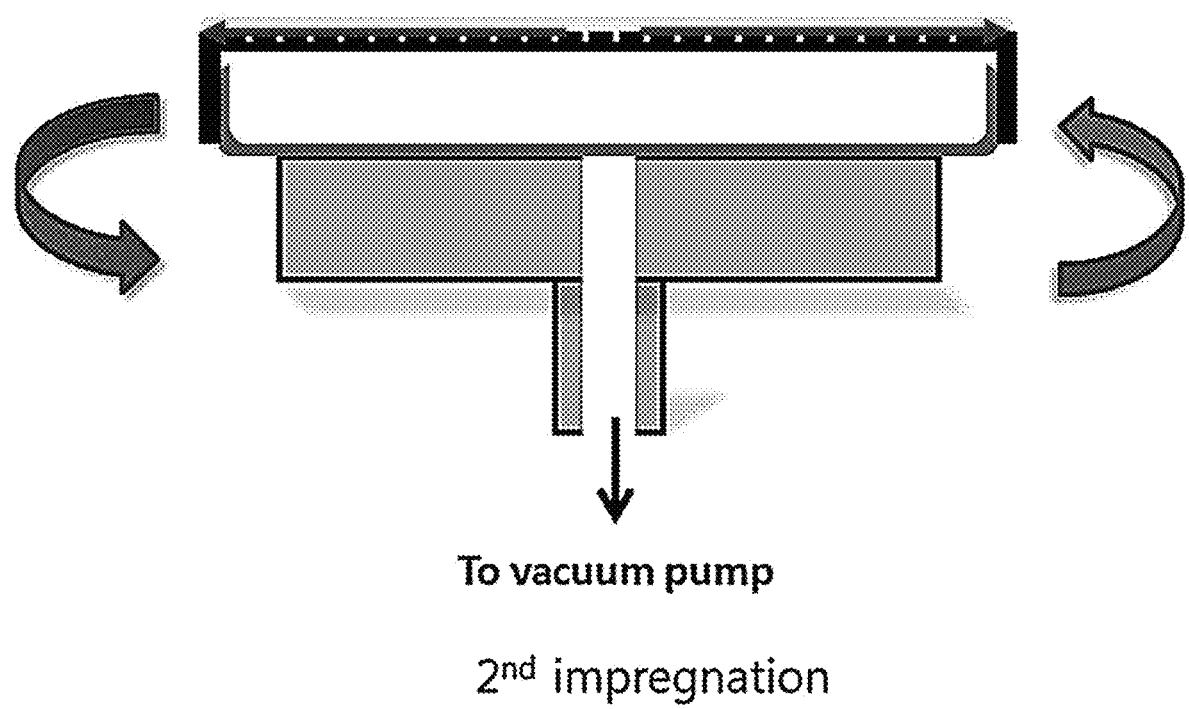
FIG. 2 is a schematic view showing a spin dry process for manufacturing a composite polymer electrolyte membrane according to an exemplary embodiment of the present disclosure.

The composite polymer electrolyte membrane of the present disclosure may be manufactured by performing the following processes with reference to FIGS. 1 and 2.

Even though not particularly illustrated, the porous support as described above is treated with acetone, methanol, ethanol, propanol, or hydrogen peroxide.

In an exemplary embodiment, a porous fluorinated polymer support as the porous support may be washed with acetone, methanol, ethanol, propanol, or hydrogen peroxide. Through the washing, the porous fluorinated polymer support may have improved wettability, and impurities may be removed from the inside and/or surface thereof.

Referring to FIG. 1, the inside of a pore of a porous fluorinated polymer support treated with acetone, methanol, ethanol, propanol, or hydrogen peroxide may be at least partially filled with a hydrogen ion conductive polymer electrolyte solution through a solution impregnation process. At this time, the hydrogen ion conductive polymer electrolyte solution is a solution including the same hydrogen ion conductive electrolyte as described above, and for example, a perfluorinated sulfonic acid ionomer (PFSA) ionomer solution may be used.

In an exemplary embodiment, a spray process may be performed as the solution impregnation process. The spray process may be performed by fixing the treated porous fluorinated polymer support parallel to a frame manufactured with a predetermined shape and spraying the perfluorinated sulfonic acid ionomer solution (hydrogen ion conductive electrolyte solution) onto the polymer support at a predetermined distance by using a spray gun connected to a gas bombe. At this time, the perfluorinated sulfonic acid ionomer solution may be sprayed at a flow rate of about 2 ml/min to about 6 ml/min under a pressure of about 2 bar to about 4 bar, so as to be uniformly sprayed without damaging the porous fluorinated support. Further, it may be preferred that the perfluorinated sulfonic acid ionomer solution is sprayed in a substantially gravitational direction onto the porous fluorinated support. In this case, the direction in which the perfluorinated sulfonic acid ionomer solution is sprayed is substantially the same as the gravitational direction, and thus, may maximize an impregnation force when the spray process is performed.

Meanwhile, in an exemplary embodiment, the perfluorinated sulfonic acid ionomer solution may include a perfluorinated sulfonic acid ionomer in an amount of about 1 wt % to about 20 wt % based on the total amount of the perfluorinated sulfonic acid ionomer solution in consideration of dispersibility when the spray process is performed. From the time when the content of perfluorinated sulfonic acid ionomer in the perfluorinated sulfonic acid ionomer solution exceeds about 15 wt %, the viscosity of the perfluorinated sulfonic acid ionomer solution is slowly increased, and when the content of the perfluorinated sulfonic acid ionomer exceeds about 20 wt %, the perfluorinated sulfonic acid ionomer solution may not be uniformly sprayed due to the high viscosity.

Referring to FIG. 2, the porous fluorinated polymer support in which the inside of a pore is at least partially filled with a hydrogen ion conductive polymer electrolyte is positioned on a spin coater, and a spin dry process is performed. The spin dry process may be performed in a state where the hydrogen ion conductive electrolyte solution filling the inside of the pore of the porous fluorinated polymer support is not completely dried, after the solution impregnation process.

The spin dry process is a process which uses a centrifugal force generated when a spin coater is rotated, and through the spin dry process, it is possible to induce a hydrogen ion conductive electrolyte in a direction different from a direction in which the hydrogen ion conductive electrolyte solution is impregnated during the solution impregnation process, that is, a direction substantially vertical to the gravitational direction (in a direction parallel to the top surface of the porous fluorinated polymer support onto which the perfluorinated sulfonic acid ionomer solution is sprayed during the spray process) and simultaneously to dry the hydrogen ion conductive electrolyte solution.

In an exemplary embodiment, the spin dry process may be performed by sequentially performing a first process performed under about 100 rpm to about 200 rpm; and a second process performed under a higher rpm than that in the first process, for example, about 3,000 rpm to about 4,000 rpm repeatedly one or more times. At this time, the first process is for partially drying the perfluorinated sulfonic acid ionomer solution sprayed through the spray process for a predetermined time, and may be performed for about 60 seconds. Furthermore, the second process is a complete drying process, and the perfluorinated sulfonic acid ionomer solution substantially completely fills the inside of the pore of the porous fluorinated polymer support and is completely dried, and is particularly for allowing polymer chains of the perfluorinated sulfonic acid ionomer to be arranged in a horizontal direction inside of the pore. Thus, the second process may be performed for a time longer than the time of the first process, for example, about 90 seconds or more. It is preferred that the first process and the second process are sequentially performed, and when the second process is performed without being subjected to the first process, cracks may occur on the surface of a composite polymer electrolyte membrane to be manufactured due to the instantaneously fast rpm. These cracks may sharply increase the gas permeability of the composite polymer electrolyte membrane, and as a result, may lead to deterioration in performance of a composite polymer electrolyte membrane and a membrane electrode assembly (MEA) and a fuel cell including the same.

Unlike the manufacturing method of the present disclosure as described above, a dipping process, a casting process, a coating process, and the like are typically used in the related art particularly when a composite polymer electrolyte membrane is manufactured. However, these processes may have limitation in filling the inside of the pore of a porous support, particularly, a porous support including a fluorinated polymer such as polytetrafluoroethylene which is hydrophobic with a polymer electrolyte. When the inside of the pore of the porous support is not sufficiently filled, and as a result, a residual pore is present in the composite polymer electrolyte membrane, a fuel permeates through the residual pore, and as a result, the performance of the membrane deteriorates, and radicals are formed when a fuel cell including the corresponding composite polymer electrolyte membrane is driven for a long period of time, and as a result, the radicals may serve to be responsible for degrading the membrane.

Furthermore, the dipping process, the casting process, the coating process, and the like are generally required to be repeatedly performed several times, and since a hot pressing process further needs to be essentially followed after the corresponding processes are performed, the manufacturing process is complicated and the polymer electrolyte is already solidified while being subjected to the corresponding processes, and as a result, the polymer electrolyte becomes little fluid, so that physical damage may easily occur to the porous support. As a result, it may be difficult to manufacture a composite polymer electrolyte membrane having excellent performance without any defect by the existing methods.

However, a composite polymer electrolyte membrane of the present invention is manufactured by a method of sequentially performing the pre-treatment process, the solution impregnation process such as the spray process, and the spin dry process as described above, and thus may have a form of a composite thin membrane including a porous support. At this time, a hydrogen ion conductive polymer electrolyte can be impregnated in various directions, and thus may more readily fill the insides of porous support pores uniformly and tightly distributed with a 3-D network structure. Accordingly, in the composite polymer electrolyte membrane, a residual pore which is not sufficiently filled with a hydrogen ion conductive polymer electrolyte, or a void may not be substantially present. In addition, since polymer chains of the hydrogen ion conductive polymer electrolyte are parallelly arranged inside of the pore through the spin dry process, a performance deterioration or degradation problem caused by low gas permeability may not occur in the composite polymer electrolyte membrane. As a result, the composite polymer electrolyte membrane according to exemplary embodiments of the present disclosure may have characteristics such as improved hydrogen ion exchange characteristics, low electron conductivity and gas permeability, and high mechanical strength as compared to the thickness, which are comparable to or better than those of an existing polymer electrolyte membrane for a fuel cell.

Further, the composite polymer electrolyte membrane can be manufactured by minimally using a hydrogen ion conductive electrolyte such as an expensive perfluorinated sulfonic acid ionomer, and thus may have an additional advantage in terms of price competitiveness as compared to the existing polymer electrolyte membrane for a fuel cell.

Meanwhile, a composite polymer electrolyte membrane for a fuel cell and a method of manufacturing the same have been described up until now, but it will be apparent to a person with ordinary skill in the art that a membrane electrode assembly composed of the composite polymer electrolyte membrane as described above, all the fuel cells including the same, for example, a polymer electrolyte fuel cell (PEMFC) also fall within the scope of the present disclosure.

The present disclosure will be described in more detail through the following Examples. However, the Examples are provided for exemplifying the present disclosure, and the scope of the present disclosure is not limited thereto.

EXAMPLES

A porous polytetrafluoroethylene support (GORE PTFE, GMM-405) was washed with acetone (Sigma Aldrich) to remove impurities and improve wettability.

After the porous polytetrafluoroethylene support washed with acetone was evenly and firmly fixed to a frame manufactured so as to have a predetermined shape by using a Teflon tape, a Nafion resin solution (Nafion perfluorinated resin solution 5 wt %, Sigma Aldrich) was uniformly sprayed the porous polytetrafluoroethylene support at a predetermined distance by using a spray gun (EWATA spray gun, W-300-101G) connected to a nitrogen gas bombe. At this time, the Nafion resin solution was sprayed in a gravitational direction onto the porous polytetrafluoroethylene support at a flow rate of 2 ml/min to 6 ml/min under a pressure of 2 bar to 4 bar. (the spray process as shown in FIG. 1 was performed)

Subsequently, the spin dry process was performed by positioning the porous polytetrafluoroethylene support sprayed with the Nafion resin solution on a spin coater (referring to FIG. 2). The spin dry process was performed by firstly performing the process under 100 rpm to 200 rpm for 60 seconds, secondly performing the process under 3,000 rpm to 4,000 rpm for 90 seconds, and then sequentially repeating the first and second procedures.

Accordingly, a composite polymer electrolyte membrane having a thickness of 15 μm was finally manufactured. It was confirmed that the manufactured composite polymer electrolyte membrane had a structure in which the inside of the pore of the porous polytetrafluoroethylene support was uniformly and tightly filled with a Nafion ionomer (perfluorinated sulfonic acid ionomer) without any residual pore, particularly, an internal structure in which the Nafion ionomer is arranged in a horizontal direction inside of the pore.

Thereafter, a membrane electrode assembly and a single cell including the same were manufactured by performing the following processes using the manufactured composite polymer electrolyte membrane.

A catalyst solution was prepared by dissolving a 46.5 wt % Pt/C catalyst in a solvent of the Nafion ionomer and isopropyl alcohol (Sigma Aldrich). The composite polymer electrolyte membrane was spread and fixed, and then the catalyst solution was sprayed onto the composite polymer electrolyte membrane by using a spray gun for spraying a catalyst. At this time, an amount of catalyst loaded in an anode and an amount of catalyst loaded in a cathode were allowed to be 0.2 $mg_{pt}/cm^2$ and 0.4 $mg_{pt}/cm^2$, respectively, and an active area was allowed to be 5 $cm^2$. Thereafter, by naturally drying the solvent of the catalyst solution until the solvent was completely evaporated, a membrane electrode assembly (MEA) including an anode electrode and a cathode electrode disposed so as to face each other, and the composite polymer electrolyte membrane interposed therebetween was manufactured.

The manufactured electrode assembly (MEA) was sequentially fastened under a pressure of 30 ln*lb, 50 ln*lb, and 70 ln*lb by using a Teflon gasket and a carbon bipolar plate, thereby manufacturing a single cell.

Comparative Example 1

After the spray process, the porous polytetrafluoroethylene support sprayed with the Nafion resin solution was firstly dried in an oven at 60° C. for 30 minutes, and secondly dried in a vacuum oven under the same conditions for 12 hours. A composite polymer electrolyte membrane having a thickness of 15 μm was manufactured by performing the same process as in the Example, except for the dry process.

Further, a membrane electrode assembly (MEA) and a single cell including the same were manufactured by the manufactured composite polymer electrolyte membrane.

Comparative Example 2

A membrane electrode assembly (MEA) and a single cell including the same were manufactured by performing the same process as in the Example, except that a Nafion 211 pure electrolyte membrane having a thickness of 25.4 um, which was composed of a perfluorinated sulfonic acid polymer, was used instead of the composite polymer electrolyte membrane having a thickness of 15 um.

Experimental Example: Evaluation of Micro-Structure of Composite Polymer Electrolyte Membrane In order to evaluate the micro-structure of the composite polymer electrolyte membrane, the cross-section (a cross-section in a direction vertical to a surface with which the sprayed Nafion ionomer solution was brought into contact), top surface (a surface with which the sprayed Nafion ionomer solution was brought into contact), and bottom surface (a surface opposite to the top surface) of the composite polymer electrolyte membrane manufactured according to the Example were observed by using a scanning electron microscope (SEM). The results are as shown in FIG. 3. Further, the top surface of the composite polymer electrolyte membrane manufactured according to the Example and the top surface of the composite polymer electrolyte membrane manufactured according to Comparative Example 1 were compared and observed by using a scanning electron microscope (SEM). The results are as shown in FIG. 4.

Figure 3A:
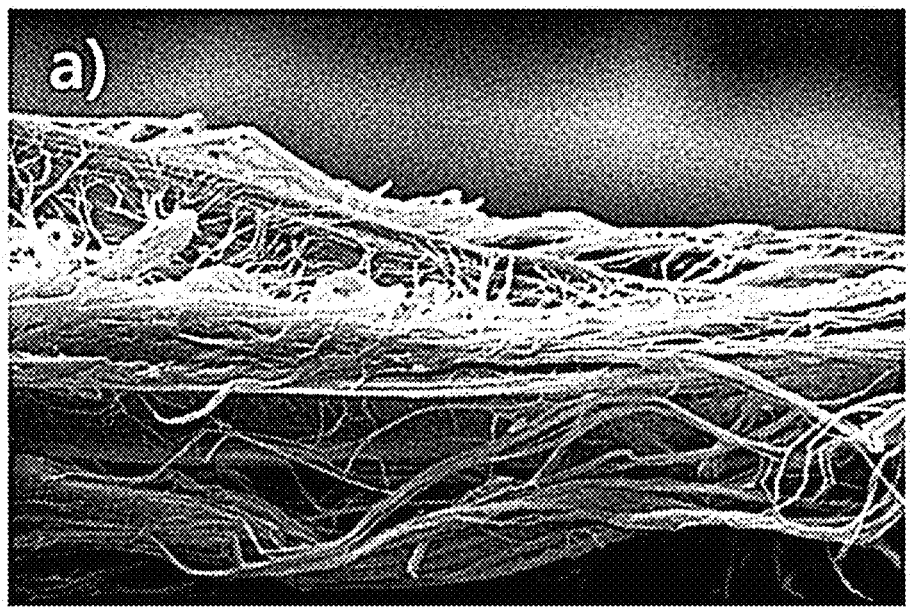
FIG. 3A is SEM photographs comparing and showing before an inside of a pore of a porous support is filled with a perfluorinated sulfonic acid ionomer (Nafion ionomer) in the manufacture of a composite polymer electrolyte membrane according to the Example.
Figure 3B:
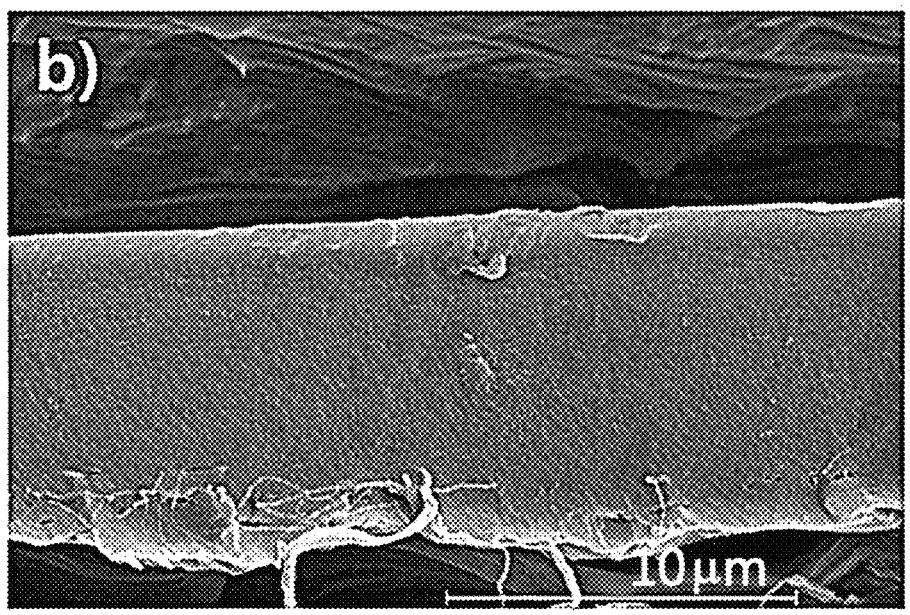
FIG. 3B is SEM photographs comparing and showing after an inside of a pore of a porous support is filled with a perfluorinated sulfonic acid ionomer (Nafion ionomer) in the manufacture of a composite polymer electrolyte membrane according to the Example.
Figure 3C:
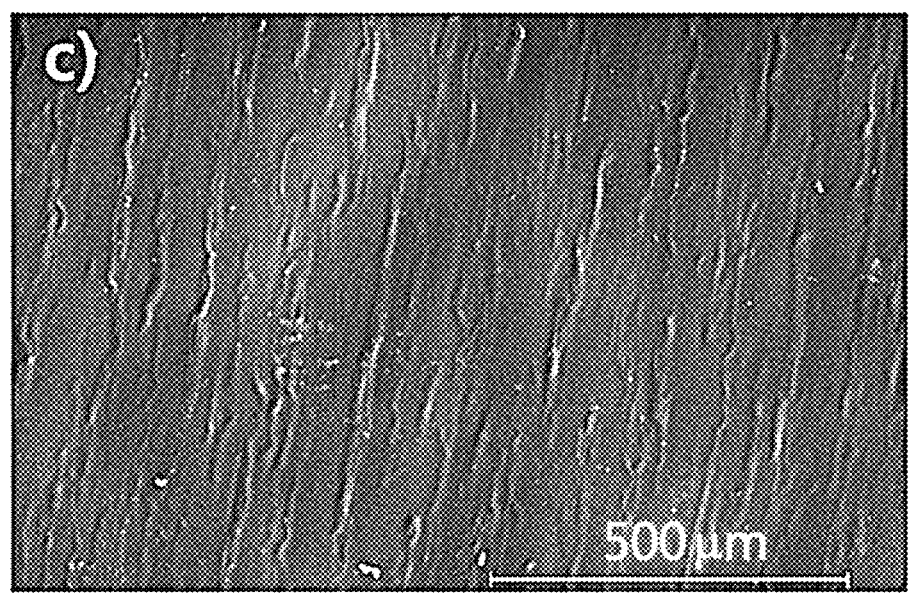
FIG. 3C is SEM photographs comparing and showing after an inside of a pore of a porous support is filled with a perfluorinated sulfonic acid ionomer (Nafion ionomer) in the manufacture of a composite polymer electrolyte membrane according to the Example.
Figure 3D:
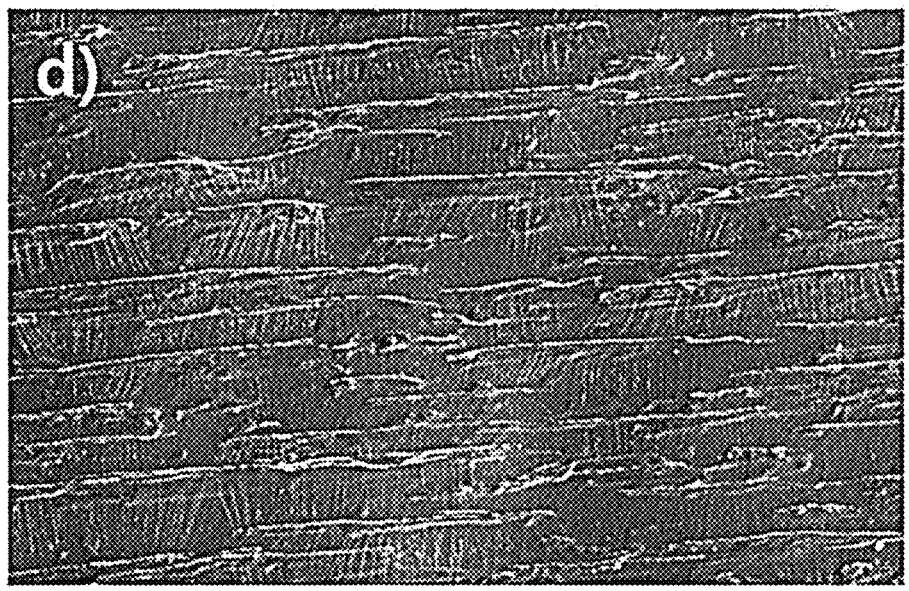
FIG. 3D is SEM photographs comparing and showing after an inside of a pore of a porous support is filled with a perfluorinated sulfonic acid ionomer (Nafion ionomer) in the manufacture of a composite polymer electrolyte membrane according to the Example.
Figure 4A:
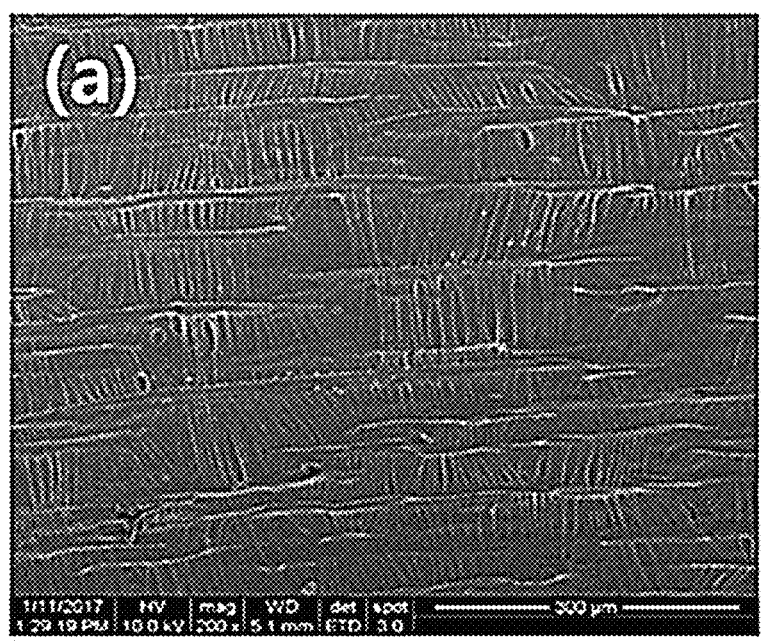
FIG. 4A is SEM photographs comparing showing the top surfaces of a composite polymer electrolyte membrane manufactured according to Comparative Example 1.
Figure 4B:
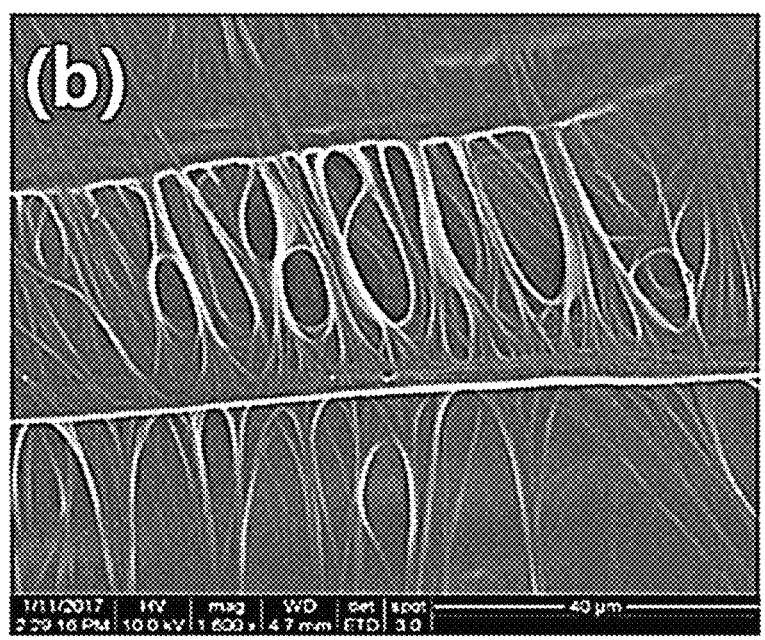
FIG. 4B is SEM photographs comparing showing the top surfaces of a composite polymer electrolyte membrane manufactured according to Comparative Example 1.
Figure 4C:
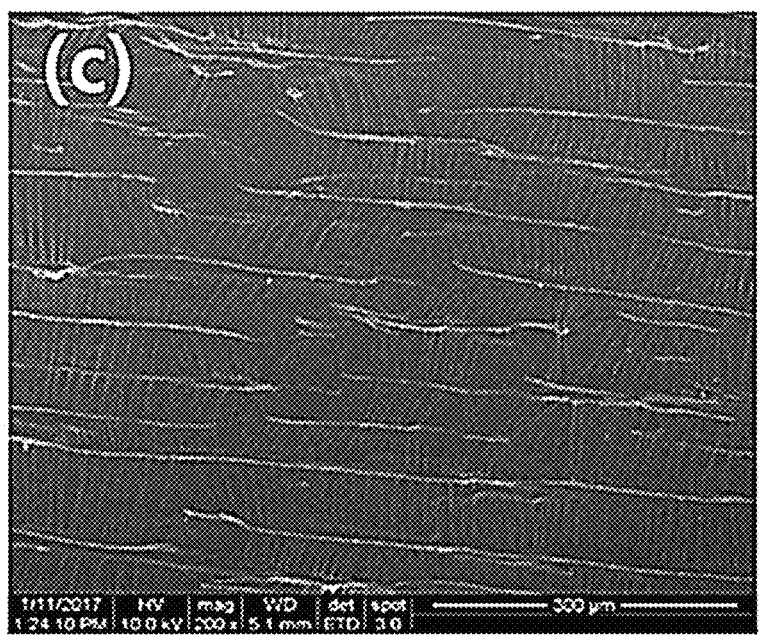
FIG. 4C is SEM photographs comparing showing the top surfaces of a composite polymer electrolyte membrane manufactured according to the Example.
Figure 4D:
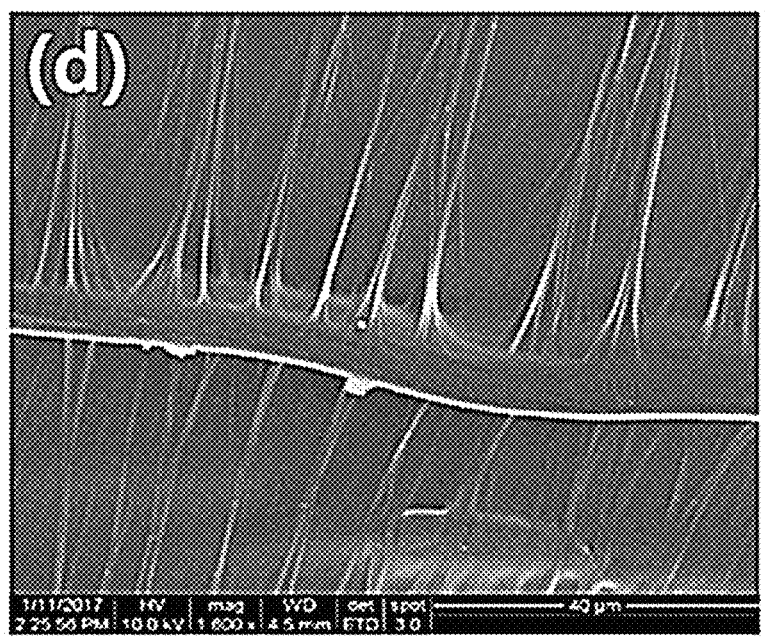
FIG. 4D is SEM photographs comparing showing the top surfaces of a composite polymer electrolyte membrane manufactured according to the Example.

Specifically, FIG. 3A is an SEM photograph showing the cross-section of the pure porous polytetrafluoroethylene support before the Nafion ionomer solution was impregnated in the manufacture of the composite polymer electrolyte membrane according to the Example, and FIG. 3B, FIG. 3C, and FIG. 3 D are SEM photographs showing the cross-section, top surface, and bottom surface of the composite polymer electrolyte membrane manufactured according to the Example, respectively. Furthermore, FIG. 4A and FIG. 4B are SEM photographs showing the top surface of the composite polymer electrolyte membrane according to Comparative Example 1, and FIG. 4C and FIG. 4D are SEM photographs showing the top surface of the composite polymer electrolyte membrane manufactured according to the Example.

Referring to FIG. 3A-D, it could be confirmed that the entire region of the porous polytetrafluoroethylene support was filled sufficiently well with an ion exchange material through the spray process and the spin dry process, and accordingly, a 15-μm thick composite polymer electrolyte membrane having a high membrane density was manufactured.

In particular, in FIG. 3A, it could be confirmed that a plurality of pores were tightly distributed with a 3-D network structure other than the simple vertical direction inside of the pure porous polytetrafluoroethylene support, and when the photographs shown in FIG. 4 were compared with one another with reference to FIG. 3A, it could be seen that it was much more effective for manufacturing a high density composite polymer electrolyte membrane implemented in the form of a thin membrane to additionally perform a spin dry process after a solution impregnation process (spray process) than to independently perform the solution impregnation process (spray process).

Therefore, to summarize those observed, it could be seen that it was possible to easily manufacture a thinned composite polymer electrolyte membrane while having excellent membrane characteristics through the manufacturing method of the present disclosure as described above.

Figure 5:
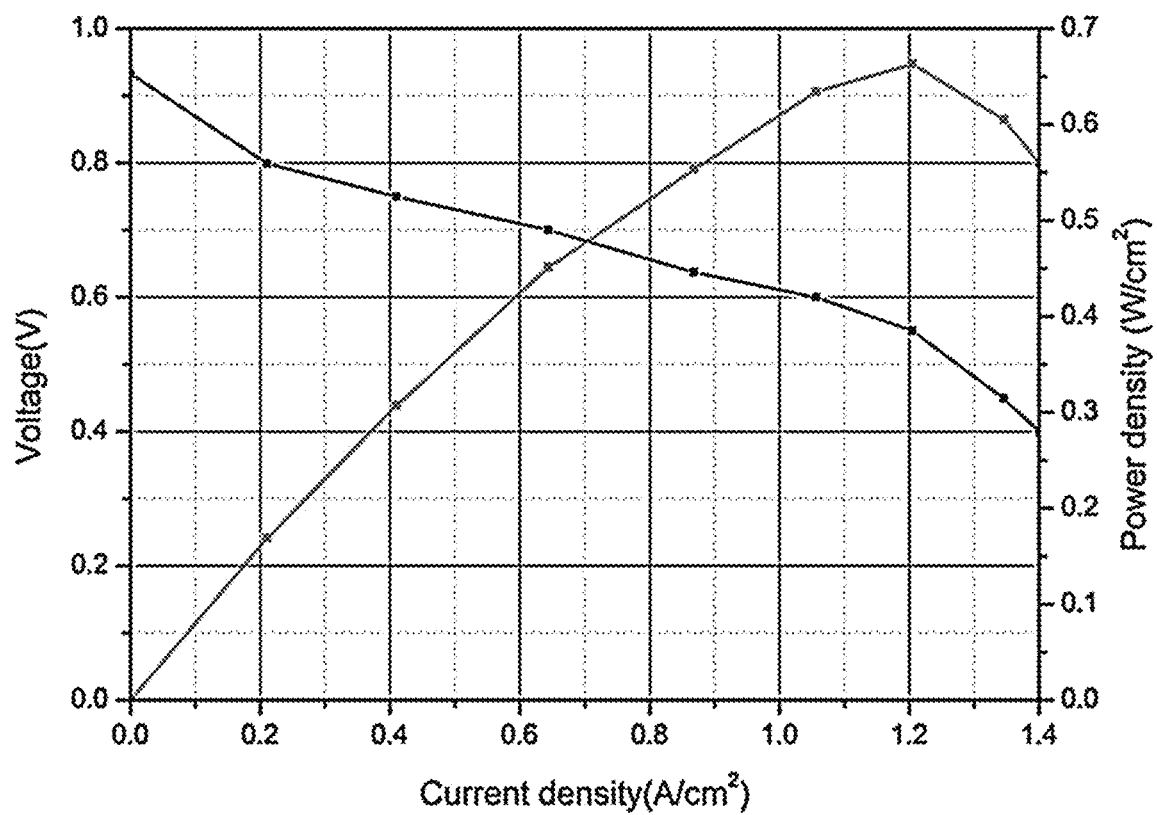
FIG. 5 is a graph showing the performance of a single cell including the composite polymer electrolyte membrane manufactured according to the Example.
Figure 6:
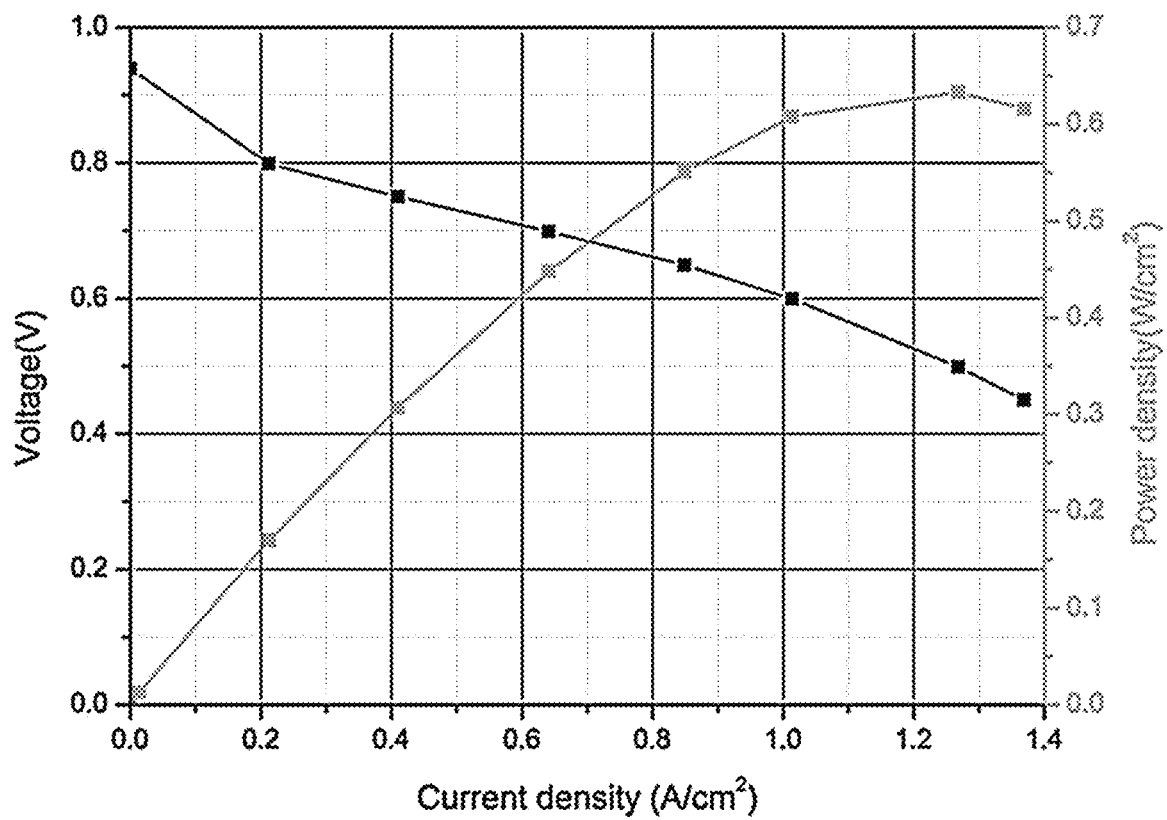
FIG. 6 is a graph showing the performance of a single cell including the composite polymer electrolyte membrane manufactured according to Comparative Example 1.
Figure 7:
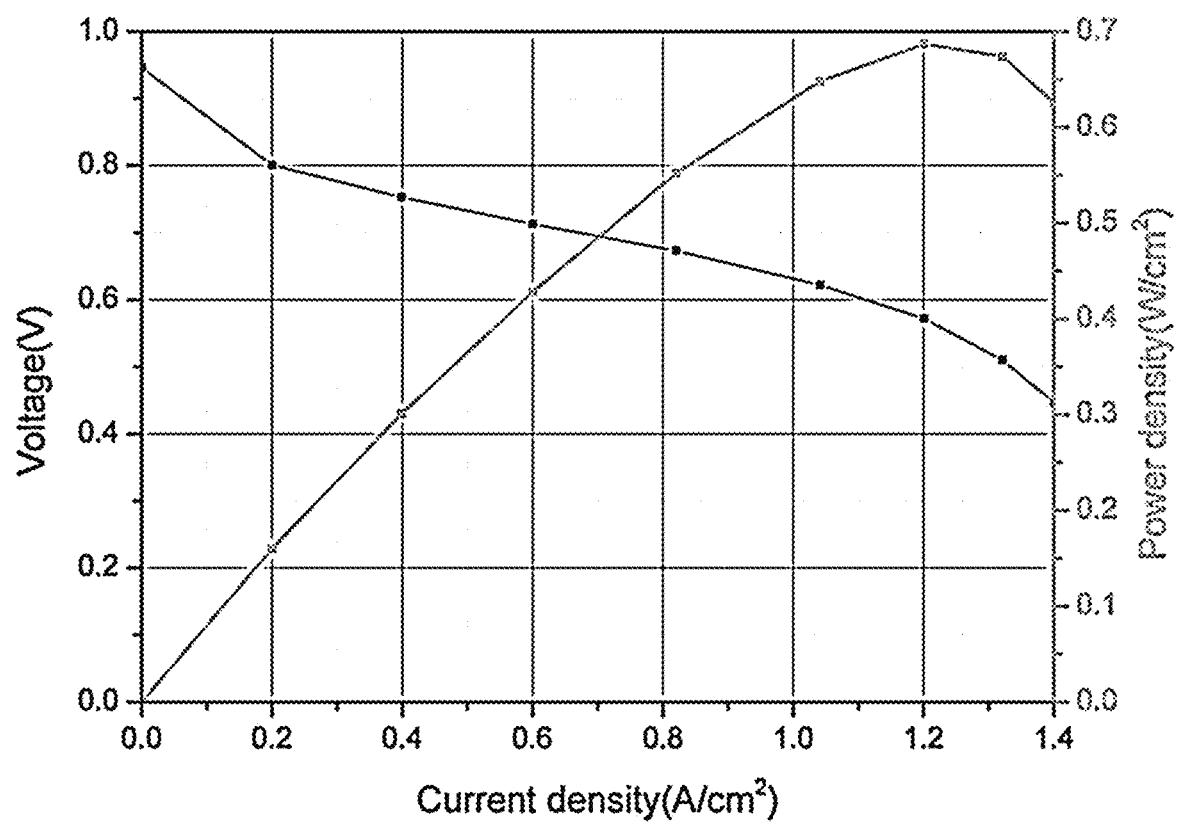
FIG. 7 is a graph showing the performance of a single cell including a pure polymer electrolyte membrane manufactured according to Comparative Example 2.

Experimental Example: Evaluation of Performance of Composite Polymer Electrolyte Membrane I In order to evaluate the performance of the composite polymer electrolyte membrane, a current-voltage (I-V) change was measured by driving the single cells including the composite polymer electrolyte membranes manufactured according to the Example and Comparative Example 1 and the single cell including the pure polymer electrolyte membrane manufactured according to Comparative Example 2. At this time, the anode was supplied with hydrogen at a flow rate of 200 cc/min, the cathode was supplied with the air at a flow rate of 600 cc/min, and the current was changed from 0 A to 7 A at a rate of 50 mA/s by driving the corresponding single cells. The results are as shown in FIGS. 5 to 7 and [Table 1]. Meanwhile, in a current-voltage (I-V) curve, the performance of the membrane electrode assembly (MEA) was evaluated based on the current density values at an open circuit voltage (OCV) and 0.6 V.

TABLE 1

|  | Example | Comparative Example 1 | Comparative Example 2 |
| --- | --- | --- | --- |
| OCV (open circuit voltage) | 0.939 | 0.933 | 0.946 |
| $A/cm^2$ @0.6 V (I-V curve) | 1.014 | 1.057 | 1.121 |
| $mA/cm^2$ @0.4 V (LSV) | 1.77 | 3.77 | 1.6 |
| Maximum power density ($W/cm^2$) | 0.633 | 0.663 | 0.688 |
| Thickness (μm) | 15 | 15 | 25.4 |
| Ionomer contents (g) | 0.0963 | 0.097 | 0.25 |
| Ionomer contents (%) | 38.52 | 40 | 100 |

Referring to FIGS. 5 to 7 and [Table 1], it could be confirmed that in consideration of the contents (measured by comparing the weights of the electrolyte membrane before and after performing the spray process and the spin dry process in the case of the composite polymer electrolyte membrane according to the Example, and measured by comparing the weights of the electrolyte membrane before and after performing the spray process in the case of the composite polymer electrolyte membrane according to Comparative Example 1) of the Nafion ionomer (the perfluorinated sulfonic acid ionomer) in the corresponding electrolyte membranes, the composite polymer electrolyte membranes according to the Example and Comparative Example 1 exhibited a performance comparable to that of the pure polymer electrolyte membrane according to Comparative Example 2 while containing an expensive Nafion ionomer in a relatively smaller amount (in a smaller content by 50% or more than that of the pure polymer electrolyte membrane according to Comparative Example 2), and particularly, the Example exhibited a much better performance than Comparative Example 1.

Through the confirmation, it could be seen that the composite polymer electrolyte membrane according to the present disclosure is economically feasible and highly efficient, and it was possible to implement a membrane electrode assembly (MEA) having a much better performance by using the composite polymer electrolyte membrane according to the present disclosure, and a polymer electrolyte fuel cell (PEMFC) including the same.

Experimental Example: Evaluation of Performance of Composite Polymer Electrolyte Membrane II In order to evaluate the performance of the composite electrolyte membrane, cyclic voltammetry (CV) and linear sweep voltammetry (LSV) were performed on the single cells including the composite polymer electrolyte membrane manufactured according to the Example and Comparative Example 1 and the single cell including the pure polymer electrolyte membrane manufactured according to Comparative Example 2. At this time, the anode was supplied with hydrogen at a flow rate of 200 cc/min, and the cathode was supplied with nitrogen at a flow rate of 600 cc/min. The results are as shown in FIGS. 8 and 9 and [Table 1].

Figure 8:
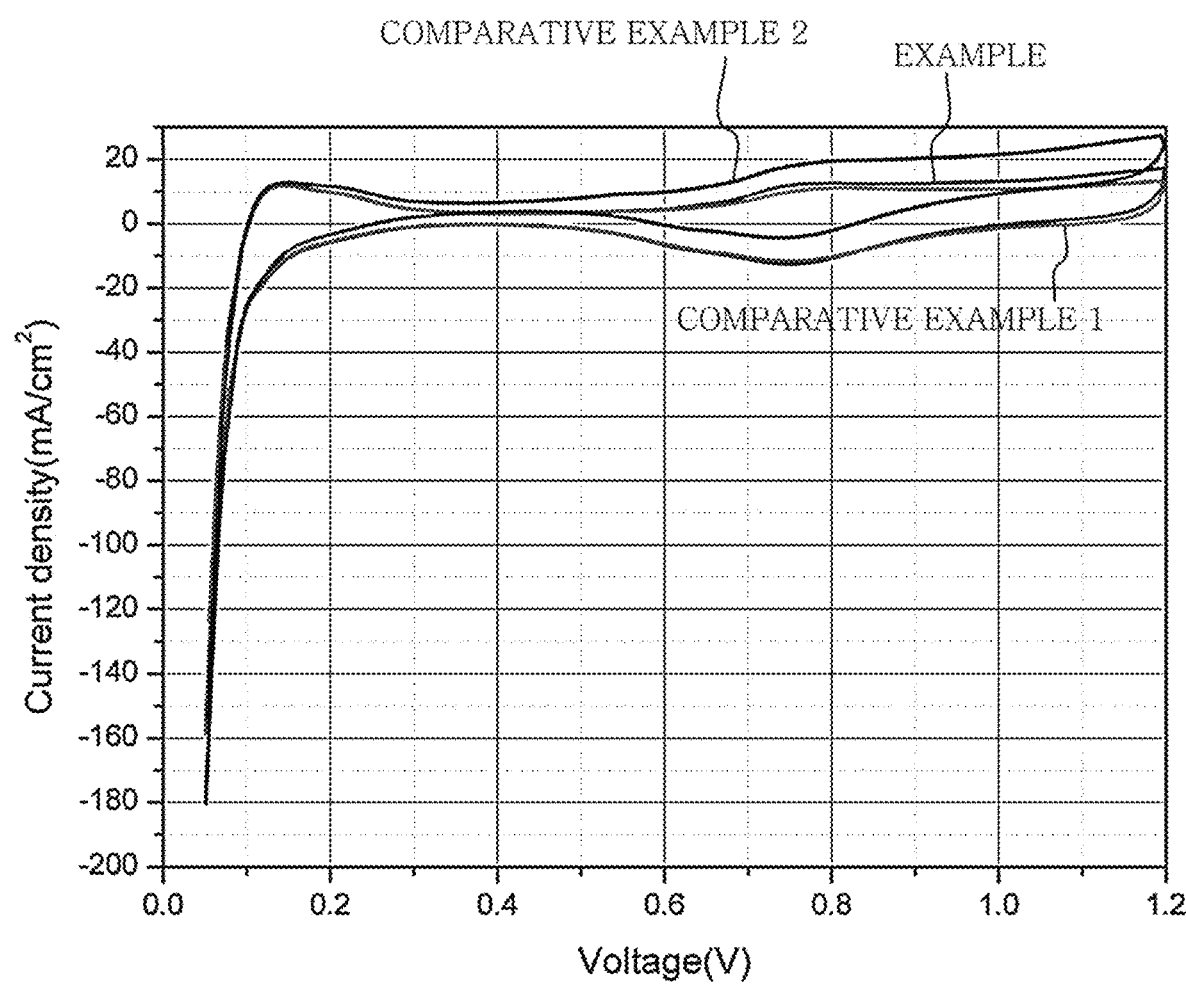
FIG. 8 is a graph comparing and showing characteristics of single cells including the composite polymer electrolyte membranes manufactured according to the Example and Comparative Example 1 and a single cell including the pure polymer electrolyte membrane manufactured according to Comparative Example 2, which are measured by cyclic voltammetry (CV).
Figure 9:
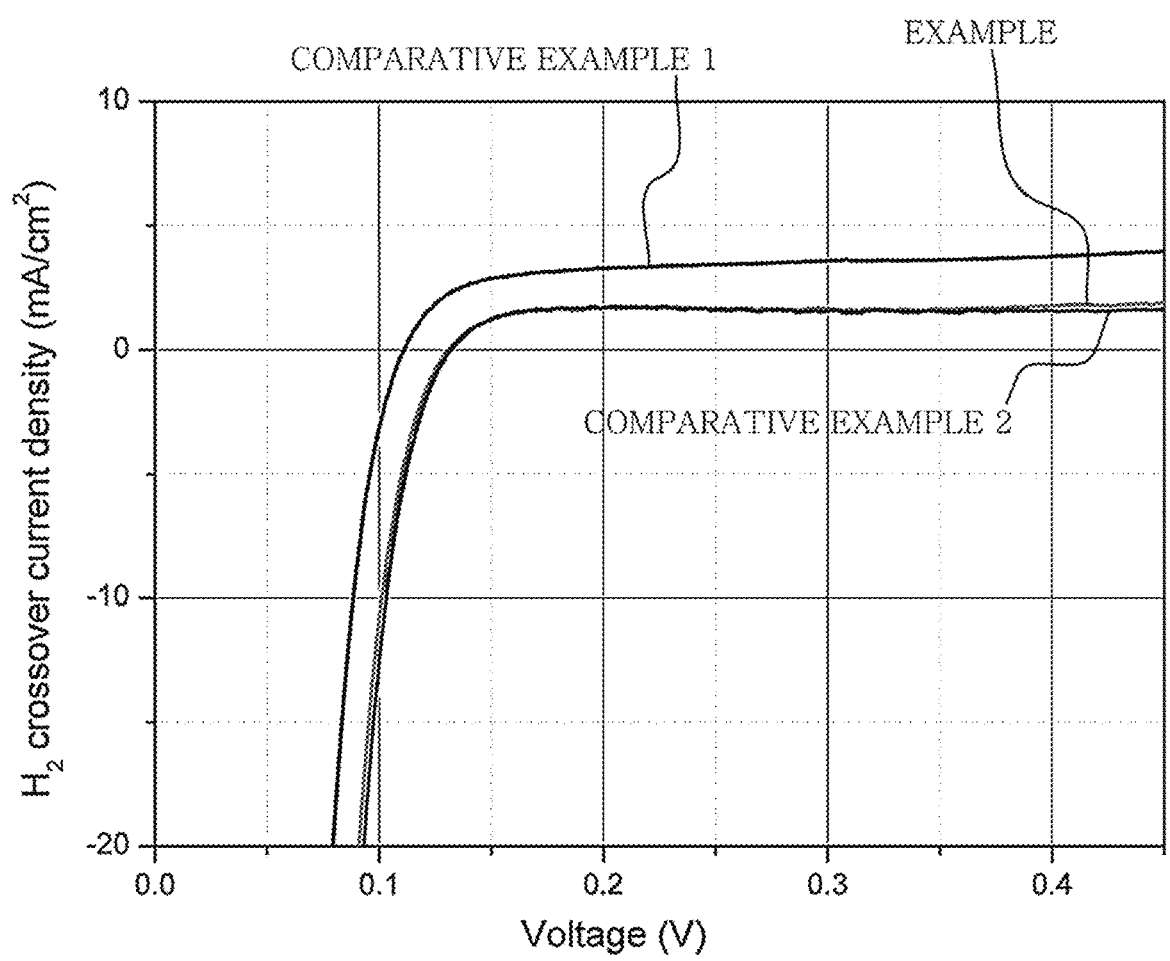
FIG. 9 is a graph comparing and showing the $H_2$ crossover current densities of single cells including the composite polymer electrolyte membranes manufactured according to the Example and Comparative Example 1 and the single cell including the pure polymer electrolyte membrane manufactured according to Comparative Example 2, which are measured by linear sweep voltammetry (LSV).

Specifically, FIG. 8 is a graph comparing and showing electrochemical characteristics of the corresponding single cells measured by using cyclic voltammetry (CV), and FIG. 9 is a graph comparing and showing the $H_2$ crossover current densities of the corresponding single cells measured by using linear sweep voltammetry (LSV).

Referring to FIG. 8, the electrochemically active region of the catalyst could be confirmed by observing an adsorption/desorption reaction occurring between the hydrogen supplied and the platinum electrode of the single cell when the single cell was driven by means of cyclic voltammetry (CV). The corresponding graph secures the reproducibility by making the measurement at a potential scanning rate of 50 mV/s from 0.05 V to 1.2 V five times in total, and then shows the value measured at the fifth time. The electrochemically active surface was evaluated based on a hydrogen desorption peak observed from 0.05 V to 0.35 V. As a result of comparing the platinum active areas of the single cells according to the Example and Comparative Examples 1 and 2 in a cyclic voltammetry (CV) graph, it could be confirmed that the electrochemically active regions of the platinum catalysts in the Example and Comparative Examples 1 and 2 coincide with each other. Through the confirmation, it can be seen that the performances, which the single cells according to the Example and Comparative Example 1 and 2 exhibit, result from characteristics of the electrolyte membranes included in the corresponding cells instead of the catalyst.

Meanwhile, the linear sweep voltammetry (LSV) was performed at a potential scanning rate of 2 mV/s in a voltage range from 0.0 V to 0.45 V, and the $H_2$ crossover current density occurring when hydrogen unreacted from the anode came to the cathode was measured by the LSV. At this time, the $H_2$ crossover current density was evaluated base on a cell voltage of 0.4 V (see [Table 1]).

Referring to FIG. 9, for the $H_2$ crossover current density at 0.4 V, the single cell according to Comparative Example 1 exhibited 3.77 mA/cm$^2$, which was a value about 2 times higher than a value of 1.77 mA/cm$^2$ which the single cell according to the Example exhibited. These results mean that when considering that the single cells according to the Example and Comparative Example 1 contain a Nafion ionomer (a perfluorinated sulfonic acid ionomer) in a content similar to that in the single cell according to Comparative Example 2, it is more effective for filling the insides of the porous support pores, which are uniformly and tightly distributed with a 3-D network structure, with a perfluorinated sulfonic acid ionomer to simultaneously perform a solution impregnation process (spray process) and a spin dry process than to independently perform the solution impregnation process (spray process), and particularly, a portion in which electrolyte polymer chain structures are parallelly arranged through the spin dry process may consequently contribute to reduction of gas permeability of the composite polymer electrolyte membrane. Furthermore, it can be seen that even though the single cell according to the Example contains the Nafion ionomer in an amount smaller by 50% or more than the single cell according to Comparative Example 2, the single cell according to the Example exhibits a hydrogen gas permeability comparable to that of the single cell according to Comparative Example 2.

Therefore, to summarize those observed, it can be seen that a single cell including the composite polymer electrolyte membrane manufactured according to the present invention exhibits excellent electrochemical activity and performance comparable to those of a single cell including a commercially available electrolyte membrane.

Experimental Example: Evaluation of Mechanical Durability of Composite Polymer Electrolyte Membrane In order to evaluate the mechanical durability of a composite polymer electrolyte membrane, a change in hydrogen gas permeability was observed by repeatedly wetting and drying the composite polymer electrolyte membranes of the single cells according to the Example and Comparative Example 1. For this purpose, both electrodes of the corresponding cells were supplied with a 100% humidified nitrogen gas at 500 cc/min for 2 minutes and with a non-humidified and completely dried nitrogen gas at 500 cc/min for 2 minutes, which was defined as one cycle, and the $H_2$ crossover current density was measured by performing linear sweep voltammetry (LSV) at a potential scanning rate of 2 mV/s in a voltage range from 0.0 V to 0.45 V at 360 cycles (24 hours). In this case, based on the initial $H_2$ crossover current densities of the single cells according to the Example and Comparative Example 1, the behavior was observed by repeatedly wetting and drying the composite polymer electrolyte membrane until the corresponding current density value finally became twice the value The results are as shown in FIG. 10.

Figure 10:
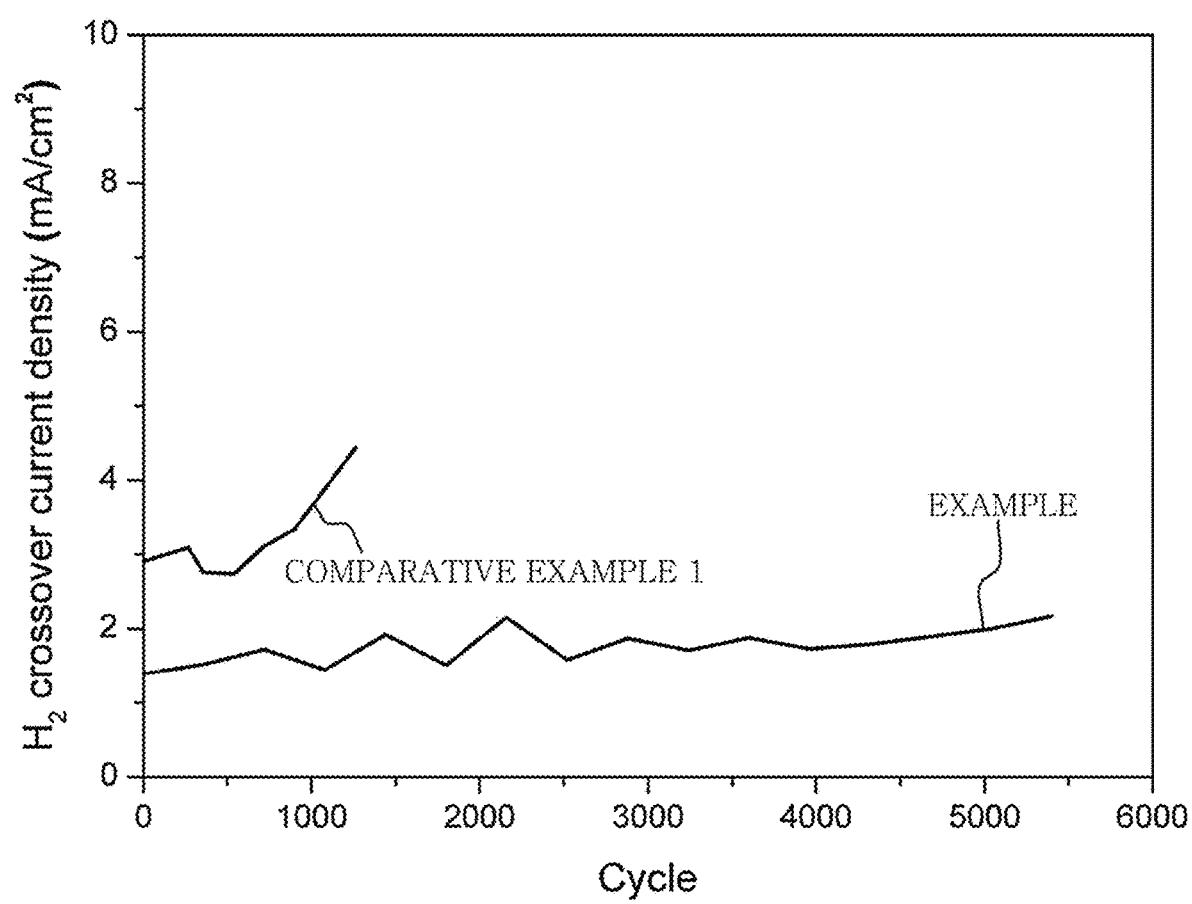
FIG. 10 is a graph comparing and showing the evaluation results of mechanical durabilities of a single cell including the composite polymer electrolyte membrane manufactured according to the Example and a single cell including the pure polymer electrolyte membrane manufactured according to Comparative Example 1.

Referring to FIG. 10, it could be confirmed that 1,260 cycles were performed until the initial H2 crossover current value became twice the value in the case of Comparative Example 1, whereas 5,400 cycles were performed in the case of the Example. When considering that a hydrophilic perfluorinated sulfonic acid ionomer filling the inside of the pore of the porous support is repeatedly wetted and dried and separated from a hydrophobic porous support, and thus generates voids inside of the composite polymer electrolyte membrane, and the generation of voids consequently leads to an increase in gas permeability of the composite polymer electrolyte membrane, the results as shown in FIG. 10 mean that the composite polymer electrolyte membrane according to the Example is 4 times or more better than the composite polymer electrolyte membrane according to Comparative Example 1 in terms of mechanical durability.

Accordingly, it can be seen that the inside of the pore of the porous support is more uniformly and tightly, that is, sufficiently filled by additionally performing the spin dry process, and as a result, it is possible to manufacture a composite polymer electrolyte membrane exhibiting excellent performance without any damage even though being exposed to repeated wetting and drying.

What is claimed is:
1. A composite polymer electrolyte membrane for a fuel cell comprising:
   a porous support; and
   a hydrogen ion conductive polymer electrolyte that completely fills pores of the porous support, and is uniformly distributed with a 3-D network structure inside of the pores, wherein the composite polymer electrolyte membrane has a thickness of 10 μm to 20 μm.

2. The composite polymer electrolyte membrane for a fuel cell according to claim 1, wherein the porous support is a porous fluorinated polymer support, and is treated with acetone, methanol, ethanol, propanol, or hydrogen peroxide prior to application of the hydrogen ion conductive polymer electrolyte.

3. The composite polymer electrolyte membrane for a fuel cell according to claim 1, wherein the hydrogen ion conductive polymer electrolyte is a perfluorinated sulfonic acid ionomer (PFSA ionomer) and is composited by being bonded to the porous support.

4. The composite polymer electrolyte membrane for a fuel cell according to claim 1, wherein the composite polymer electrolyte membrane constitutes a membrane electrode assembly of a polymer electrolyte fuel cell.

5. The composite polymer electrolyte membrane for a fuel cell according to claim 1, wherein the composite polymer electrolyte membrane has a thickness of 10 μm to 15 μm.

6. A method of manufacturing the composite polymer electrolyte membrane of claim 1 for a fuel cell comprising:
   partially or totally filling inside of a pore of a porous support with a hydrogen ion conductive polymer electrolyte solution by performing a solution impregnation process; and
   drying the hydrogen ion conductive polymer electrolyte solution to completely the inside of the pore with the hydrogen ion conductive polymer electrolyte solution by performing a spin dry process on the porous support in which the inside of the pore is partially or totally filled with the hydrogen ion conductive polymer electrolyte solution.

7. The method according to claim 6, wherein the spin dry process is performed after the solution impregnation process is performed.

8. The method according to claim 6, wherein the hydrogen ion conductive polymer solution is a perfluorinated sulfonic acid ionomer (PFSA ionomer) solution, and wherein the porous support is a porous fluorinated polymer support.

9. The method according to claim 8, wherein the perfluorinated sulfonic acid ionomer solution comprises a perfluorinated sulfonic acid ionomer in an amount of 1 wt % to 20 wt % based on a total amount of the perfluorinated sulfonic acid ionomer solution.

10. The method according to claim 6, wherein the solution impregnation process is a spray process, and is performed by spraying the hydrogen ion conductive polymer solution onto the porous support.

11. The method according to claim 10, wherein during the spray process, the hydrogen ion conductive polymer electrolyte solution is sprayed at a flow rate of 2 ml/min to 6 ml/min under a pressure of 2 bar to 4 bar.

12. The method according to claim 11, wherein the hydrogen ion conductive polymer electrolyte solution is sprayed in a gravitational direction onto the porous support.

13. The method according to claim 6, wherein before performing the solution impregnation process, the method further comprises treating the porous support with acetone, methanol, ethanol, propanol, or hydrogen peroxide.

14. The method according to claim 6, wherein the spin dry process comprises:
   a first spin dry process performed under 100 rpm to 200 rpm; and
   a second spin dry process performed under 3,000 rpm to 4,000 rpm for a longer period of time than the first spin dry process,
   wherein the second spin dry process is performed for 90 seconds or more after the first spin dry process, and
   wherein the first spin dry process and the second spin dry process are sequentially performed repeatedly one or more times.

* * * * *